United States Patent [19]
White, Jr. et al.

[11] 3,780,421
[45] Dec. 25, 1973

[54] METHOD OF JOINING PIPES IN A HOSTILE ENVIRONMENT

[75] Inventors: William E. White, Jr.; Lloyd E. Billingsly, both of Houston, Tex.

[73] Assignee: Hydrotech Services, Inc., Houston, Tex.

[22] Filed: Aug. 17, 1972

[21] Appl. No.: 281,467

Related U.S. Application Data

[62] Division of Ser. No. 65,648, Aug. 20, 1970, Pat. No. 3,707,025.

[52] U.S. Cl. ............... 29/466, 29/200 P, 61/72.3
[51] Int. Cl. ............................................. B23q 3/00
[58] Field of Search................. 29/234, 282, 280, 29/466, 200 P, 200 R; 285/363, 414, 405, 285/417, 418; 61/72.3, 43

[56] References Cited
UNITED STATES PATENTS

| | | | |
|---|---|---|---|
| 3,267,682 | 8/1966 | Robley | 61/72.3 |
| 3,658,366 | 4/1972 | Welch et al | 61/72.3 |
| 3,517,520 | 6/1970 | Hammett | 61/72.3 |

*Primary Examiner*—Charles W. Lanham
*Assistant Examiner*—James R. Duzan
*Attorney*—Lee R. Larkin

[57] ABSTRACT

A method and apparatus for joining the ends of two work pipes in a generally hostile environment and wherein the pipes are generally not parallel. The method includes loosely mounting work couplings on each of the work pipe ends and with each of the work couplings having biased flanges arranged to accommodate the bend which will occur in the pipe when the coupling is completed and wherein the couplings will have to be rotated relative to each other to arrive at the proper angular relationship therebetween. The work pipes are moved to the position such that the axes thereof intersect. The method includes constructing a model, preferably in a favorable environment, which is positionally representative of the work pipe ends and work couplings. Thereafter, the model couplings are manipulated to the mating position by trial and error. Preferably, the model couplings will be dimensionally representative of the work couplings and both the work couplings and the model couplings will have identical indicia, such as numerals, marked thereon. Once the mated position of the model couplings is known, the relative position of the indicia thereon is utilized to similarly manipulate the work couplings to the mating position, to thereby eliminate trial and error in aligning the work couplings in the hostile environment.

11 Claims, 5 Drawing Figures

METHOD OF JOINING PIPES IN A HOSTILE ENVIRONMENT

REFERENCE TO RELATED APPLICATIONS

This application is a division of application Ser. No. 65,648 filed Aug. 20, 1970, now U.S. Pat. No. 3,707,025.

BACKGROUND OF THE INVENTION

1. Field of the Invention

This invention generally relates to a method and apparatus for joining two sections of misaligned pipe. More particularly, this invention relates to a method for joining the ends of two misaligned pipes in a hostile environment.

2. Description of the Prior Art

It is sometimes necessary to join the ends of two pipes in a hostile environment, such as in a body of water. For example, when connecting two pipes under water, the activity attendant to construction of a pipeline often stirs up silt and mud from the bottom of the body of water. The silt or mud thus stirred up hampers the activity of the divers attempting to join the two pieces of pipe. It is difficult for the divers to accurately align and join the pipe ends when the equipment and pipes are obscured by the stirred-up mud. Also, it is extremely difficult for the divers to manipulate large heavy pieces of pipe or attendant equipment under a body of water. Divers can remain under water for only relatively brief work periods. The work is often exhausting and sometimes the connection made is not accurate due to the inaccuracy of measurements and difficulty experienced by divers in handling the heavy equipment. Methods heretofore used were essentially the same as those used in connecting pipe in favorable environments, which methods are not fully satisfactory in a hostile environment such as an underwater location. Generally speaking, the work couplings have heretofore been aligned by trial and error, which is very difficult in a sub-sea location.

SUMMARY OF THE INVENTION

It is therefore an object of this invention to provide an improved method for joining the ends of two pipes in a hostile environment.

This invention includes loosely mounting work coupling means on each of the submerged pipe ends. A model is constructed in a more favorable environment, which model is positionally representative of the work pipe ends and work coupling means. The model coupling means are then manipulated to the mating position for joining the model pipe ends. The work pipe ends and work coupling means in the hostile environment are then manipulated to the same mating position as the model pipe ends and coupling means and joined by securing the coupling means together and to the pipe ends. The method is particularly useful in joining pipes, the axes of which intersect at an angle, and where the coupling means are in the form of couplings having flanges that are biased to the axis of the coupling.

Certain embodiments of the invention include the steps of aligning the pipe ends and coupling means, whereby the central axes of the pipes intersect, and rotating at least one of the coupling means about the axis of the pipe on which the coupling means is mounted.

The method may include the step of determining the vertical relationship of the pipes by placing a round object inside one of the pipe ends, whereby gravity causes the object to roll to the bottom position to thereby indicate the vertical relationship. Data concerning the minimum and maximum intervals of the pipe ends and the relationship thereof to the vertical is communicated to the remote location, and data concerning the position of the indicia on said mated model coupling is communicated from the remote location to the hostile environment.

The invention may be utilized to perform procedures in a hostile environment with a maximum of accuracy and minimum of expense. Use of the invention requires workmen to remain in the hostile environment for only a minimum period of time.

BRIEF DESCRIPTION OF THE DRAWINGS

The invention may be further understood by reference to the drawings, in which.

DESCRIPTION OF THE PREFERRED EMBODIMENT

Figure 1:
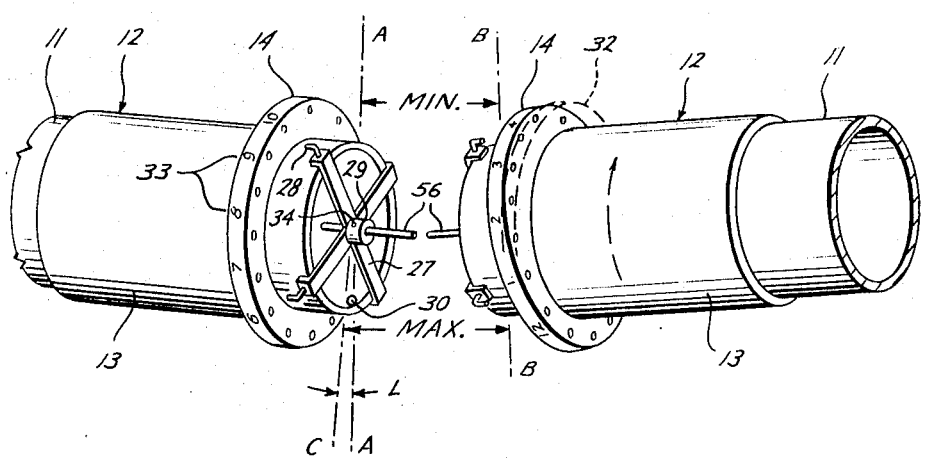
FIG. 1 is an isometric view of the ends of two work pipes and associated work couplings located in a sub-sea position, showing the center line axes of the two pipes intersecting.
Figure 4:
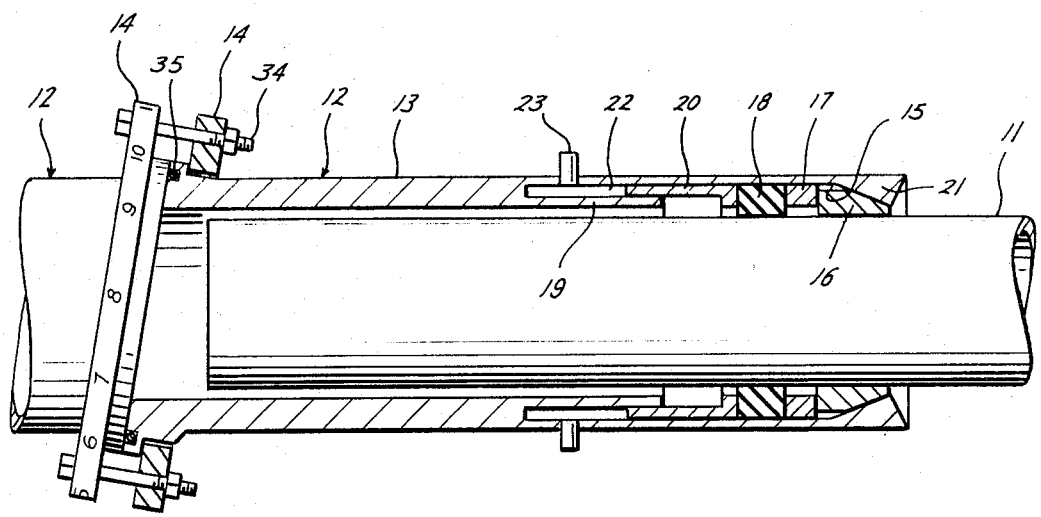
FIG. 4 is a partial sectional view in side elevation showing the details of construction of the coupling means which may be used with the invention.

Referring to FIG. 1, the ends of two pipes 11, which are to be joined and which are located in a sub-sea location, are shown with loosely fitted coupling means, conveniently taking the form of work couplings 12. Couplings 12 include a cylindrical body 13 and a bias flange 14, with each flange being set at an angle of 10° away from the perpendicular with respect to the central axis of the coupling. Body 13 of coupling 12 is provided with means for attaching coupling 12 to pipe 11, as, for example, hydraulically actuated slip 16 as shown in FIG. 4. An annular slip 16 is disposed at one end of recess 15 between body 13 and pipe 11, as shown in FIG. 4. Spacer ring 17 is included between slip 16 and annular packing 18. A piston assembly comprising an inner annular portion 19, attached to coupling body 13, and piston 20, located within cavity 22 formed between portion 19 and body 13, is arranged to move slip 16, spacer ring 17 and annular packing 18 axially outwardly toward the radially inwardly sloping surface of the bowl 21 of body 13. Piston 20 is arranged to be moved axially outwardly toward bowl 21 by means of fluid pressure injected into cavity 22 through inlet 23 from any appropriate source. As pressure is applied to cavity 22, annular packing 18, spacer ring 17 and slip 16 are forced toward bowl 21. Slip 16 engages the outside surface of pipe 11 and packing 18 is compressed into fluid-tight engagement with pipe 11.

Couplings 12 are each provided with a bias flange 14, which flanges are arranged for mating engagement with each other when placed in parallel planes. At least one of the flanges 14 may include a compressible o-ring 35 which is received in a circular groove on the face thereof, which seals the connection between couplers 12. The plane of flange 14 is canted at an angle with respect to body 13, which angle enables connection to be made between pipes whose central axes are not parallel. Ideally, the plane of flange 14 is canted about 10° from normal to the central axis of body 13. The angular bias of flange 14 is illustrated by its relation to a plane 32 (shown by dotted lines in FIG. 1) normal to the central axis of body 13. Optionally, one of the flanges 14 may be constructed to rotate relative to the coupling to which it is attached to facilitate line-up of bolt holes.

Figure 3:
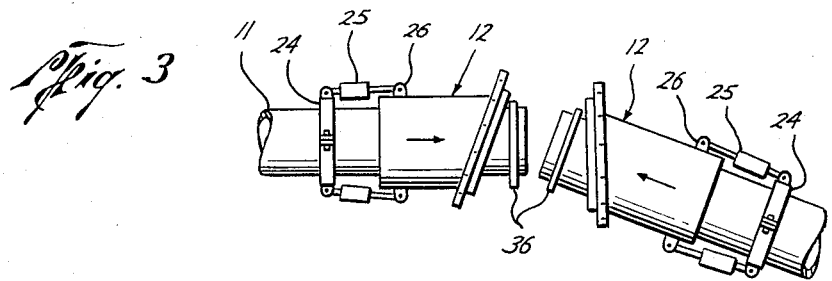
FIG. 3 is a side elevation view in partial section of two pipe ends and associated coupling means, showing restraining and moving mechanisms associated with the work couplings and pipes.

As shown in FIG. 3, when couplings 12 have been loosely mounted on pipes 11, keeper clamps 36 are initially affixed to the ends of pipes 11 and anchor clamps 24 may be attached behind couplings 12 on pipes 11. Keeper clamps 36 restrain couplings 12 from falling off the ends of pipes 11 during manipulation thereof. Anchor clamps 24 provide a connection point on pipes 11 for hydraulic rams 25, which are connected at opposite ends to lugs 26 on couplings 12. Rams 25 utilize a pressure source such as air (not shown) to move the heavy couplings about on pipes 11.

Next, the pipes are put in position so that their central axes intersect. The presence of properly intersecting central axes is determined by alignment of the centerline wands 56, coincident with the respective central axes of pipes 11, to intersect, as shown in FIG. 1. Each wand 56 is supported by a four-legged support 27 attached to pipe 11 by lock screws 28. Each wand 56 may be moved axially or held firmly in place with respect to pipe 11 by loosening or tightening a set screw 34 in a hub 29 at the intersection of the four legs of support 27. A diver may issue instructions to the operators of lifting equipment on the surface to move pipes 11 to properly align centerline wands 56 or, in the case of small pipes, the diver may align pipes 11 manually.

After pipes 11 are positioned so that their central axes intersect, as shown by the intersection of wands 56, the position of pipes 11, relative to each other and to the vertical, is ascertained. The positional relationship of pipes 11 to each other is determined by measuring the distances of minimum and maximum gaps between the circumferences of the ends of pipes 11, shown in FIG. 1 by the intersection of the dotted lines A—A and B—B with the respective circumferences of the ends of pipes 11. Next, the verticality of the plane containing these four maximum-minimum points (depicted by the legends MAX and MIN in FIG. 1) is determined by inserting a roller 30 in the end of pipe 11, with roller 30 having the longitudinal axis thereof parallel to the longitudinal axis of the pipe into which roller 30 is inserted. Gravity will move roller 30 to the lowermost vertical point of the end of pipe 1. (shown by the intersection of line C and circumference of pipe 11 in FIG. 1). Then, the distance between the lowermost point and either a maximum or minimum point on the pipe end may be measured. The angular difference of vertical line C and line A—A is represented in FIG. 1 by angle L.

Figure 5:
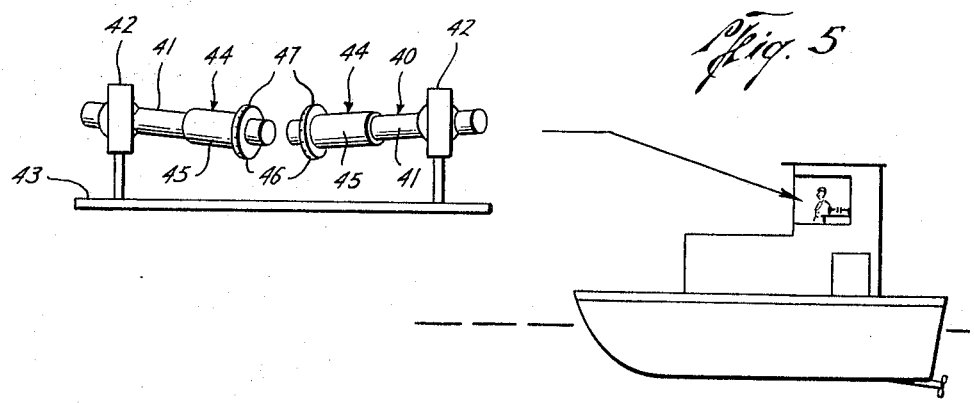
FIG. 5 is a combined schematic view of a remote location for a model of the pipe ends and coupling means and isometric view of the model constructed at such remote location.

The measurements of position (i.e., maximum and minimum gap distances) and verticality of the maximum and minimum gap intervals of pipes 11 in the hostile environment are transferred or communicated to a remote location, such as a boat or barge 31 overlying the work pipe, as shown in FIG. 5. At the remote location, a model, generally designated by the numeral 40, is constructed, which model is representative of the positional relationship of pipes 11 and couplings 12, by reference to the aforesaid measurements. Model pipe ends 41 are held positionally by a pair of friction swivel mounts 42 which are mounted on a base 43. A model coupling 44 is slipped over each of model pipe ends 41. Model coupling 44 is comprised of a body 45 and a bias flange portion 46, proportionally identical to body 13 and bias flange 14 of work coupling 12. The measurements from the hostile environment are proportionally applied to model 40, and the model parts are positioned relative to the vertical and to each other to positionally represent work pipe ends 11 in the hostile environment.

Work couplings 12 and model couplings 44 are provided with indicia 33 and 47 about the periphery of flanges 14 and 46, respectively, as shown in FIGS. 1 and 5. These indicia may take the form of numbers arranged in clock-faced fashion about the coupling flanges. For example, the number 6 may be placed at the point of the major angle of the bias flange and the number 12 at the minor angle. Indicia 33 and 47 allow couplings 12 to be aligned properly by remote instruction.

When the information regarding verticality and gap measurements is received at remote location 31 and model 40 has been constructed, model couplings 44 are manipulated and rotated by trial and error on the ends of model pipes 41 until flanges 46 are parallel and touching each other along their full circumferences. At that point, indicia 47 on each of model couplings 44 are aligned in unique positions opposite each other and with respect to a maximum or minimum proximate point on model pipe 41 and a maximum or minimum point of verticality on model pipe 41. The relationship of the indicia to each other and to the maximum or minimum verticality points on pipe 41 is communicated to the diver or worker in the hostile environment. For example, an instruction from the site of the model could be, "Align mark 8 on the northernmost coupling with the low vertical point on the northernmost pipe. Then align mark 4 on the southernmost coupling with mark 8 on the northernmost coupling."

Figure 2:
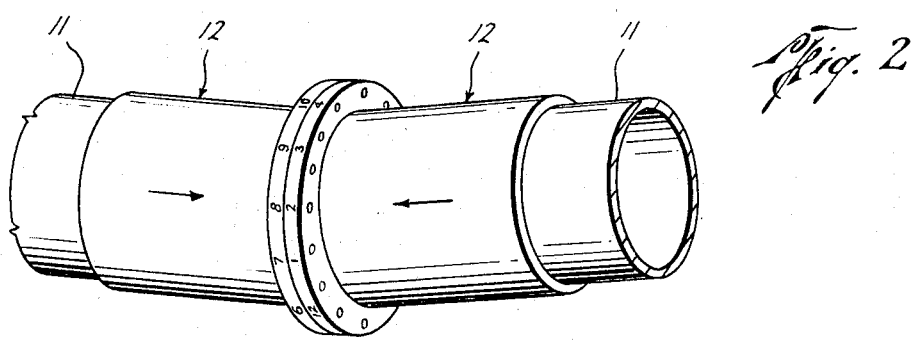
FIG. 2 is an isometric view of the two pipe ends and associated work couplings of FIG. 1, showing the couplings moved to the mating position.

Pursuant to the instructions received from remote model site 31 and after having removed clamps 36, the operator in the hostile environment either manipulates couplings 12 by hand or directs lifting equipment on the surface to perform the manipulations. Rams 25, actuated from the surface or with equipment at the site may be utilized to manipulate couplers 12 responsive to directions from the operator in the hostile environment. The manipulations are performed on couplings 12 (such as the rotation thereof about its longitudinal axis and axial sliding thereof toward the open end of pipe 11 on which coupling 12 is mounted) to put couplings 12 in the mating attitude (as shown in FIG. 2) positionally identical to the attitude of model couplings 44. At this time, suitable means such as bolts 34, as shown in FIG. 4, may be utilized to sealingly engage couplings 12 together at flanges 14.

After couplings 12 have been joined, pressure conduits (not shown) are connected to inlet 23 of each coupling 12, preparatory to permanently joining couplings 12 to pipes 11 on which couplings 12 have heretofore been only loosely mounted. Fluid under pressure is injected through inlet 23, causing annular piston 20 to move axially therein. As piston 20 moves axially therein, slip 16, spacer ring 17 and packing 18 move axially toward radially inwardly slanted bowl 21 of coupler 12. Bowl 21 forces slip 16 radially inward into grasping engagement with pipe 11 and compresses packing 18 into sealing engagement with pipe 11. The joining process permanently and rigidly affixes each coupler 12 on its respective pipe 11 and completes the joining of the two pipes. The fluid injected against piston 20 may be an epoxy material which will set up after a specified time period.

Thus it can be seen that a rapid and accurate alignment and joining method is shown for joining pipes in a hostile environment. This apparatus and method eliminates the trial and error method of mating the work couplings in the hostile environment. Time spent by operators in the hostile environment is reduced dramatically and time is saved in utilization of the expensive equipment. This description of the method is to be construed as illustrative only, and other alternatives and embodiments of this invention will be apparent to those skilled in the art in view of this description.

What is claimed is:

1. In a method for joining the ends of two work pipes in a generally hostile environment, the combination of steps comprising:
   loosely mounting work couplings on each of said pipe ends;
   constructing a model positionally representative of said pipe ends and couplings;
   manipulating said model couplings to the mating position for joining said model pipe ends;
   manipulating said work pipe ends and work couplings in said hostile environment to the same mating position as said model pipe ends and couplings;
   and, joining said pipe ends in said hostile environment by securing said work couplings together and to said pipe ends.

2. The invention as claimed in claim 1 including:
   measuring the maximum and minimum gap intervals between said work pipe ends;
   and, locating the relative position of said gap intervals with respect to the vertical.

3. The invention as claimed in claim 1 including:
   aligning said work pipe ends and couplings whereby the central axes of said work pipes intersect;
   and, rotating at least one of said work couplings about the axis of the pipe on which said coupling is mounted.

4. The invention as claimed in claim 1 wherein said joining step includes:
   rigidly affixing said work couplings together;
   and, rigidly affixing each of said work couplings to the pipe on which said coupling is mounted.

5. In a method for joining the ends of two pipes located in a generally hostile environment, the combination of steps comprising:
   loosely mounting mating work couplings on each of said pipe ends, each of said work couplings having bias flange means thereabout and having a plurality of circumferentially spaced indicia thereabout;
   orienting said pipe ends to a position wherein the centerline axes thereof intersect;
   measuring the maximum and minimum gap intervals between said pipe ends;
   determining the relative position of one of said gap intervals relative to the vertical;
   constructing a model representative of the positional relationship of said work pipe ends at a remote location, said model including a pair of spaced apart model pipe ends, with each of said model pipe ends having a model coupling mounted thereon and with each of said model couplings having indicia and bias flange means thereon representative of the indicia and bias flange means on said work couplings;
   moving said model couplings to the mating position on said model ends;
   reading the positional relationship of said indicia on said model couplings in said mating position relative to each other and to the vertical;
   moving said work couplings to the position wherein the indicia thereon assume the same relative positional relationship as the indicia on said model couplings in said mating position, to thereby mate said work couplings;
   and, rigidly attaching said work bias flange means together and said work couplings to said pipe ends to complete the joining of said pipe ends.

6. The invention as claimed in claim 5 wherein:
   said step of determining said vertical relationship includes placing a round object inside one of said pipe ends, whereby gravity causes said object to roll to the bottom position, to thereby indicate said vertical relationship.

7. The invention as claimed in claim 5 wherein said moving step includes:
   rotating at least one of said work couplings about the axis of the pipe on which said coupling is mounted and moving said work couplings axially together.

8. The invention as claimed in claim 5 including:
   communicating data concerning said minimum and maximum gap intervals of said work pipe ends and the relationship thereof to the vertical to said remote location;
   and, communicating data concerning said positional relationship of said indicia on said mated model couplings from said remote location to said hostile environment.

9. In a method for coupling the ends of two work pipes in a hostile environment, the combination of steps comprising:
   engaging work coupling means with each of said pipes, each of said coupling means having a body portion for mounting over the end of one of said pipes and a flange portion lying in a plane which is intersected by the central axis of said body portion such that the minor angle of said intersection is less than 90°;
   aligning said work pipe ends whereby the central axes of said pipes intersect;
   constructing a positional model of said two pipes and associated coupling means at a remote location;
   measuring the lowest vertical point on the circumference of one of said work pipe ends;
   measuring the distance between the maximum and minimum proximate points of said circumferences of said work pipe ends;

communicating data concerning the relative positions of said pipe ends to said remote location;

manipulating said model pipe ends and coupling means to a position representative of said work pipe ends and associated work coupling means;

rotating said coupling means of said model whereby the planes of said flange portions of said model coupling means are parallel;

communicating information of the relative positions of said model coupling means in mating position to said hostile environment location;

rotating said coupling means in said hostile environment in accordance with the information received in said communication step, whereby said flanges of said work coupling means occupy a mating position;

joining said mating flanges;

and, rigidly affixing said coupling means to said pipe ends, whereby said pipe ends are rigidly coupled to each other.

10. In a method of joining the ends of two work pipes in a generally hostile environment, the combination of steps comprising:

loosely mounting work coupling means on each of said pipe ends;

temporarily attaching to each of said pipe ends an apparatus providing a physical representation of the center lines of said pipes;

manipulating said pipes until said representation apparatus indicates that the axes of said pipes intersect;

removing said representation apparatus;

manipulating said work coupling means to mating positions;

and, joining said pipe ends by securing said work coupling means together and to said pipe ends.

11. In a pipe coupling simulator for use in joining two work pipes the center lines of which may not be coincidental, but which may be arranged to intersect, the combination comprising:

a support base;

a pair of longitudinally spaced apart pipe supports mounted on said base;

a model pipe articulatedly connected to and supported by each of said supports, with said connections being arranged to permit movement of said model pipes to positions of having intersecting center lines throughout a range of angles;

and a model coupling slidably mounted over each of said model pipes, with each of said couplings having a tilted flange connected thereto and a series of individually discrete symbols provided circumferentially thereabout, whereby said model couplings can be rotated and slidably moved together to mating positions throughout a plurality of said centerline angles and whereby the relative positions of said series of symbols with respect to each other may be monitored for use in connecting said work pipes.

* * * * *